United States Patent [19]

Messner

[11] 4,056,363

[45] Nov. 1, 1977

[54] APPARATUS FOR THE FABRICATION OF PURE ALUMINA FROM $AL_2O_3$ AND SILICA CONTAINING RAW MATERIALS BY LEACHING WITH HYDROCHLORIC ACID

[76] Inventor: Georg Messner, Latemar-Strasse 7, 8000 Munich 90, Germany

[21] Appl. No.: 661,982

[22] Filed: Feb. 27, 1976

Related U.S. Application Data

[62] Division of Ser. No. 453,265, March 21, 1974, Pat. No. 3,959,438.

[51] Int. Cl.² .................... B01D 9/02; B01D 11/02; C01F 7/22; C01F 7/04
[52] U.S. Cl. .................... 23/270 R; 23/271 R; 23/273 R; 23/305 A; 210/82; 210/393; 423/132; 423/126; 23/279
[58] Field of Search ............. 23/267 R, 271 R, 270 R, 23/273 R, 305 A, 279, 286; 210/82, 393; 423/122, 132, 126, 111, 495, 629

[56] References Cited

U.S. PATENT DOCUMENTS

| 1,494,029 | 5/1924 | Scofield | 423/132 |
| 1,519,880 | 12/1924 | Specketer | 423/132 |
| 1,778,083 | 10/1930 | Marburg | 423/132 |
| 1,780,821 | 11/1930 | Henderson | 23/271 |
| 2,376,696 | 4/1945 | Hixson | 423/132 |
| 2,551,944 | 5/1951 | Kaufmann | 423/271 |
| 2,551,944 | 5/1951 | Hoff | 423/133 |
| 3,343,919 | 9/1967 | Miller | 23/271 |
| 3,690,828 | 9/1972 | Baetz | 423/133 |
| 3,958,947 | 5/1976 | Robinson | 23/271 R |

OTHER PUBLICATIONS

Chem & Met's Chem Engin Flow Sheets, 4 Ed., Eli Olive, 1944, McGraw-Hill, p. 7, Coy w. Emery PU175.
Tilley et al., Acid Processes For The Extra Of Alumina, Dept of Comm. Beau of Mins, Bulletin 267, 1927/36, pp. 1–84.

Primary Examiner—Stephen J. Emery
Attorney, Agent, or Firm—Hammond & Littell

[57] ABSTRACT

An apparatus for the production of pure alumina from alumina and silicate containing raw materials comprising means to feed said raw material into the top of an acid resistant leaching tower; means to continuously feed a leaching liquor containing hydrochloric acid into the bottom of said leaching tower, means to continuously flow said leaching liquor upward through said raw material to leach out the alumina as a solution of aluminum chloride, means to withdraw said solution enriched in aluminum chloride toward the top of said tower zone; means to withdraw said raw material solid residue from the bottom of said tower zone to convey said solid residue from said leaching tower into a separation zone at a level higher than the level of said leaching tower; and means to separate said solid residue from said carrier liquid in said separation zone.

13 Claims, 6 Drawing Figures

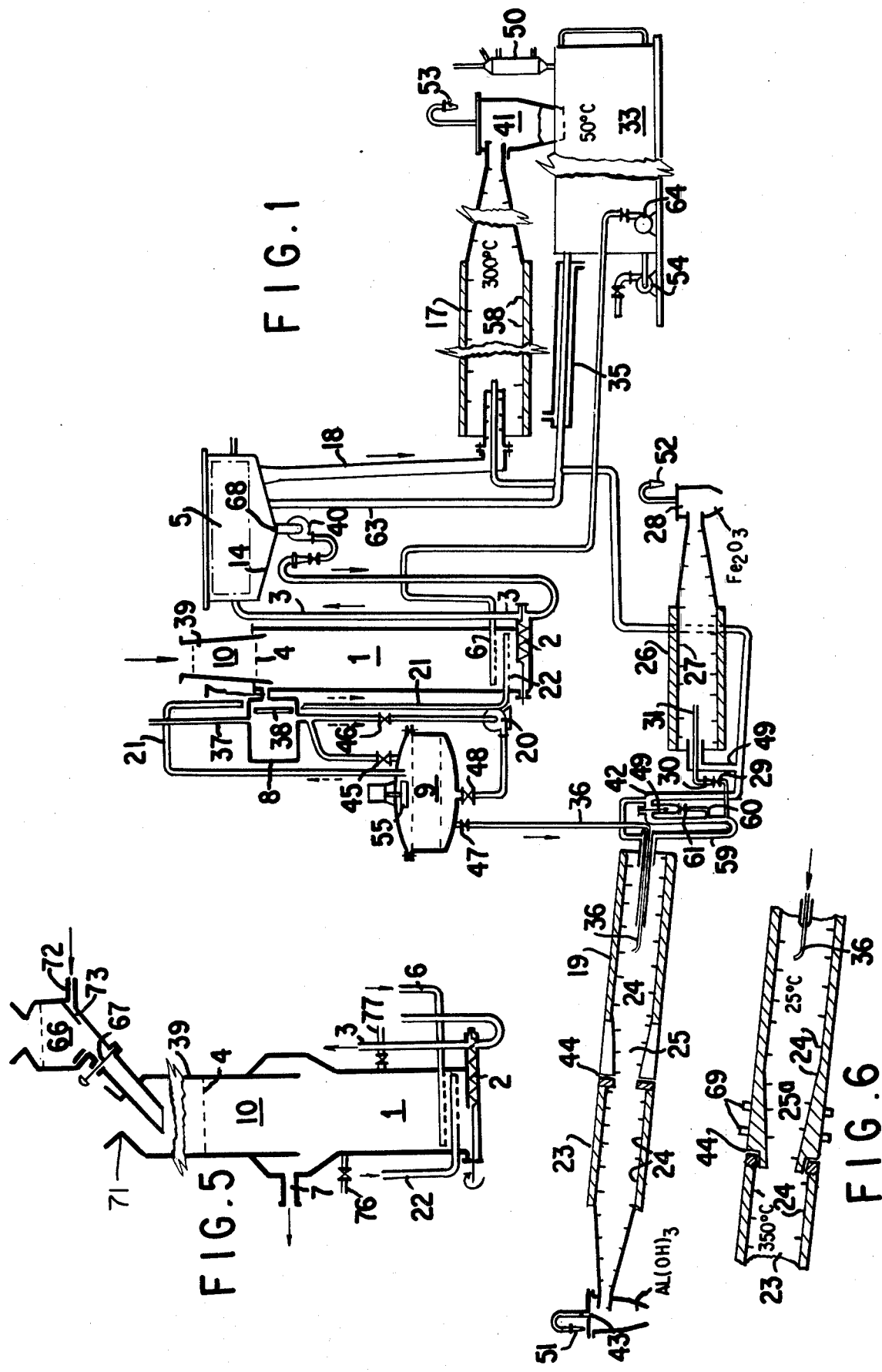

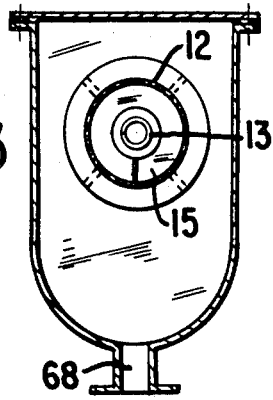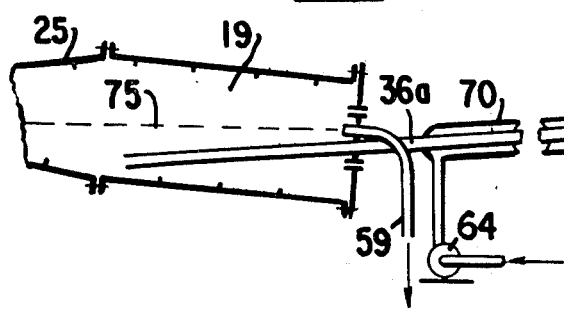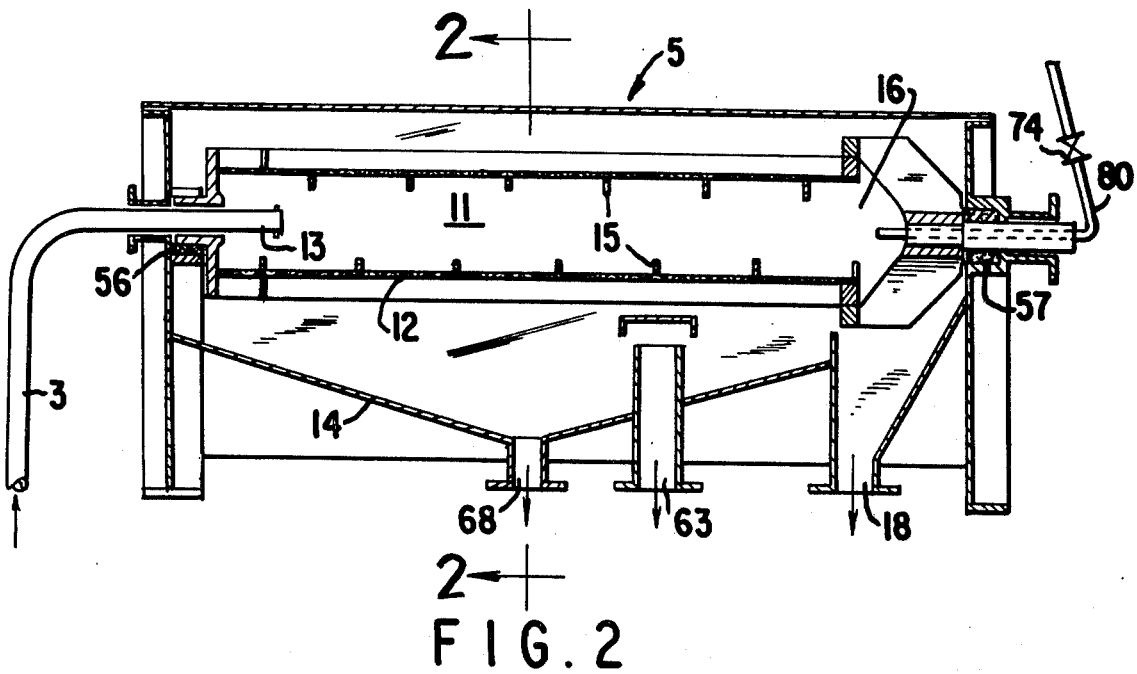

APPARATUS FOR THE FABRICATION OF PURE ALUMINA FROM AL₂O₃ AND SILICA CONTAINING RAW MATERIALS BY LEACHING WITH HYDROCHLORIC ACID

This is a division of Ser. No. 453,265, filed Mar. 21, 1974 now U.S. Pat. No. 3,959,438.

THE PRIOR ART

German Patent No. 414,128 (1921) proposes the use of HCl solutions for the leaching of $Al_2O_3$ from minerals, such as bauxite, clay or other sources, for the production of pure alumina especially for the aluminum industry. The need for such a process has become more important over the years, since the better grade and higher quality bauxite, needed for the Bayer process have become rarer. U.S. Pat. No. 2,249,761 proposes leaching clay with hydrochloric acid on a continuous countercurrent basis, in which the separation of iron contained in the clay is by organic solvents and the aluminum chloride crystals are washed with a mother liquor. These prior proposed methods of a hydrochloric acid leaching have several disadvantages. One difficulty is the complications of these proposed methods, which, make them prohibitively expensive and which in combination with the corrosiveness of HCl result in high equipment cost and expensive maintenance costs.

OBJECTS OF THE INVENTION

It is an object of the present invention to provide an economical apparatus for producing pure alumina from alumina and silicate containing raw materials comprising contacting this raw material with a leaching liquor containing HCl.

Another object is to provide apparatus for producing pure alumina from raw material containing alumina and silicate in which the decomposition of $AlCl_3 \cdot 6\ H_2O$ into $Al(OH)_3$, HCl and water provides fresh aqueous solution of HCl which is recycled back to the leaching tower to be utilized as leaching liquor.

A further object of the invention is to provide a solution rich in $AlCl_3$ which also contains an amount of $FeCl_3$ sufficient to permit the crystallization and separation of $AlCl_3$ in substantial quantities by merely lowering the temperature of the solution and recycle the HCl and $H_2O$ formed during $AlCl_3 \cdot 6\ H_2O$ decomposition.

These and other objects of the present invention will become apparent as the description thereof proceeds.

DESCRIPTION OF THE INVENTION

The above-mentioned disadvantages of the prior art processes can be overcome by the present invention in which the raw material may first be treated, for example, by calcination and disaggregation, in order to sufficiently increase its $Al_2O_3$ solubility and then extracted with HCl preferably by counter current leaching.

THE DRAWINGS

My invention will be described by reference to the accompanying drawings which illustrate preferred embodiments of the invention but are not intended to limit the invention to the embodiments shown.

FIG. 1 shows the acid leaching and aluminum oxide recovery system as a whole.

FIG. 2 shows the liquid-solid-separator in greater detail.

FIG. 3 is a sectional view along the line 2—2 of FIG. 2.

FIG. 4 shows a modified leaching tower and the heat exchanger for preheating the mother liquor from the crystallizer.

FIG. 5 shows a modified form of raw material charging chute and leaching tower.

FIG. 6 shows a modified form of washing crystallizer.

FIG. 1 shows a vertical leaching tower 1 open to the atmosphere at its top lined with acidproof material such as brick or other acidproof material. Its horizontal cross section is smaller at the top than near the bottom. A prepared (calcined) solid raw material, such as clay, is fed continuously or semi[1] continuously into the top of the tower 1 through the feeder 10. The leached solid residue goes to the bottom of tower 1 and is continuously or semi-continuously removed.

An HCl containing leaching liquor is introduced continuously through the screen-pipe 6 near the bottom of tower 1. The leaching liquid flows upwards through the particles of the solid raw material in the tower 1 and is heated by the dissolution heat of $Al_2O_3$ in the acid, while the solid raw material moves slowly downward countercurrently. The solution leaves the tower 1 through the overflow pipe 7 located at least 1.5 to 2 meters below the raw material feeder 10, which is open at its top and which is maintained full of solid raw material up to the level 39. The overflow solution is a hot solution of $AlCl_3$; and, after passing through the balancing container 8 or surge tank and the backwashable sand filter 9, is introduced through pipe 36 into the $AlCl_3$ crystallizer 19. The leaching tower 1 is operated at a very low upward flow velocity of the leaching liquor through the solid raw material. The advantage of this low velocity is that the entire solid material with all its leached out, fine particles moves down toward the bottom of tower 1 at a regulated outlet speed controlled by one or more screw conveyors 2, preferably horizontal in position. By the use of low flow velocity, very few fine, residue particles are carried up and out of the top of tower 1 into the sand-filter 9 so that backwashing of filter need only be performed after long time intervals. The level indicators 37 and 38 continuously indicate the pressure drop in filter to show if backwashing of the sand-filter 9 is needed.

An alternative way to provide a clear $AlCl_3$ solution is to maintain in the upper region of the leaching tower 1 such an excess amount of the solid raw material, that the rising leach liquor solution will have already lost practically all of its free HCl content before it reaches the overflow level 7. The additional thick layer of unreacted new raw material, such as clay or bauxite, functions as a mechanical filter, which is not influenced by chemical disintegration of the raw material. In order to monitor the operating conditions in the upper part of the leaching tower 1, one or more sampler tubes 76 and 77 (FIG. 5) may be provided at different levels for the removal of leach solution for analysis of its free HCl or $AlCl_3$ at these levels.

The raw material for the leaching step, should be thoroughly dried, before being fed into the feeder shaft 10 of the leaching tower 1, in order to avoid introducing an excess of water into the $AlCl_3$ solution and in order to provide a margin for the quantity of wash water needed for the solid residue (as will be described later).

Total calcination of all the raw material is unnecessary and some uncalcined material is desirable from the point of view of $Al_2O_3$ dissolution due to the high concentration of $FeCl_3$ in the leaching liquid and to preventing an extended residence time in the leaching tower 1. In certain cases a lesser amount of washing water for the solid residue may be used as a consequence of residual water of crystallization of the caolinite which dissolves in the AlCl₃ solution.

It is useful first to drive off all free moisture from the raw material, for example, by utilizing the hot combustion waste gases from the decomposer 23 for the AlCl₃ . 6 H₂O crystals or from other heat sources of the process. There are at least two elements of apparatus in which water vapor is formed. The first is in the AlCl₃ . 6 H₂O decomposer 23, in which in the formation of Al(OH)₃, three mols of water are liberated, and in the formation of Al₂O₃, 4.5 mols of water are liberated from one mol of AlCl₃ . 6 H₂O. The second is in the dryer 26 for the evaporation of HCl and H₂O from the resulting fraction of mother liquor. About 4.7 mols of water are formed per 1 mol of Al₂O₃ produced, based upon a content of 11.7% FeCl₃ in the mother liquor and a content of 2.6% Fe₂O₃ and 34% of Al₂O₃ in the raw material.

An additional stripper column 71 (FIG. 5) may be provided on column 1 to insure complete prevention of HCl solution or vapor escaping from the top of tower 1.

Hot HCl-H₂O vapor mixture from furnace dryer 26 may be passed through the stripping layer 66, shown in FIG. 5, composed of dry pieces of calcinated bauxite or calcinated clay. The introduction of the hot H₂O-HCl vapors from dryer furnace 26 is made through conduit 72 into the ring space 73. Condensation of water from these vapors happens only initially when a new charge of cold calcinated bauxite or clay is fed in. Feeding hot calcinated material, condensation of water can be nearly fully avoided.

Absorption of HCl on the other hand is possible, because chemically active Al₂O₃ reaction sites are available. The vapors rise upwards through the layer 66, which is supplied at such a rate with new calcinated material as to never exhaust perfectly its reacting Al₂O₃ content. Thus the HCl vapors can react with the Al₂O₃ contained therein, while the vapors are too hot to allow considerable amounts of water to condense. The bulk of water vapor passes through the layer 66 free of HCl and into the atmosphere, or through an exhaust stack.

It is preferable that the new material in layer 66 not be completely exhausted of Al₂O₃ when it finally joins the layer 71. The vertical dimension of layer 66 must be such to provide a sufficient thickness of the raw material, which thickness depends upon the rate of absorption of the HCl vapors. The amount of HCl vapor in question is only about 2% of the total HCl required for the Al₂O₃ dissolution reaction.

It is also preferable that the horizontal cross section of the stripper layer 66 is such that the speed of the HCl vapors is kept low therethrough. Thus the volume of layer 66 should provide a sufficient residence time for these vapors. Depending upon size and shape of the equipment, the linear speed of the vapors should not exceed more than about 5 cm/sec, corresponding to a diameter of the stripper layer of about 2.8 meters, and based upon a production of 100 tons per day of product.

The most efficient method for the elimination of water in the raw material is by calcining the clay or bauxite, which not only eliminates the water of hydration in the caolinite, but also increases the reactivity of the Al₂O₃ toward HCl.

The stripper layer 66 has to absorb only about 2% of the totally reacting HCl, and so it is useful to provide for the absorption of HCl the mentioned separate stripper layer 66 at a level above the feeder shaft 10. This separate layer 66 is separated from layer 71 by a sluice gate 67, which is preferentially fed with calcinated raw material. Hot HCl-H₂O-vapors are passed through this layer 66, while the feeder shaft 10 is fed with calcined or non-calcined raw material from the top and HCl solution from the bottom of the leaching tower 1.

This has the advantages: that if the raw material is to be substantially non-calcined, then only about 4-6% of the total raw material fed into feeder 10 has to be calcined. There is a partial hydration of only a small fraction of the stripper raw material by the water vapor to be eliminated. There is no need for the hot HCl-H₂O-vapors from dryer 26 to heat up the total amount of feed material; so the temperature rise of the small amount of stripper material is larger and its selectivity to the HCl-H₂O-mixture is better. The hot HCl-H₂O-vapors coming from furnace 26 can be removed by partial vacuum on the upper end of the stripper 66, with only negligible interference with the raw material feeding.

Before the stripper capacity of column 66 is exhausted the sluice gates 67 are opened for a moment and the nearly exhausted stripper load enters the feed shaft 10 to become part of the total feed material.

The hot AlCl₃ solution from the top of tower 1 after passing through the filter 9 flows with a temperature of about 120° C through line 36 to a crystallizer thermal decomposer tube 19 – 23 in which the AlCl₃ solution is crystallized and thermally decomposed to Al(OH)₃ by the following reactions

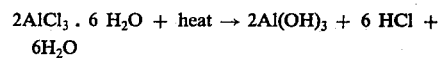

The crystallizer-thermal-decomposer tube, or "hot-cold tube", is composed of the hot zone 19 and cold zone 23 and is preferably made of densely impregnated graphite, titanium, tantalum or other HCl resistant materials with the exception of those component parts which cause the rotation of the "hot-cold tube". A clear solution of AlCl₃, at about 120° C, leaves the sandfilter 9 by gravity flow, or by pump pressure, and flows through pipe 36 into the relatively cold crystallizer zone 19 of the "hot-cold tube" operating at about 10° C to 60° C, preferably at 55° C. There it mixes with the mother liquor already present in the crystallizer, which remains after the AlCl₃ . 6 H₂O crystallization from prior solution of AlCl₃ flowed through crystallizer 19. The AlCl₃ present in the solution entering through pipe 36 is caused to crystallize out as AlCl₃ . 6 H₂O by the combined actions of lower temperature and reaction with the HCl-H₂O vapors coming from the relatively hot zone decomposer 23 of the "hot-cold tube", eliminating in this manner the major portion of the AlCl₃ content of the AlCl₃ solution introduced through pipe 36. These AlCl₃ . 6 H₂O crystals are moved forward in the crystallizer zone 19 towards and into the relatively hot zone decomposer 23 by the action of the flights of screw conveyor 24 of the rotating crystallizer 19. These crystals pass through the preferentially conical intermediate washing zone 25 between the relatively cold portion 19 and the relatively hot portion 23 of the rotating "hot-cold tube". The average temperature of the relatively cold portion 19 is about 55° C, while the temperature of the hot zone 23 is from 300° C to 400° C with the average being about 350° C. The junction of the decomposer 23 and the washing zone 25 is equipped with a heat insulating gasket 44. Tubes 19 and 23 are connected so as to rotate at the same speed.

In the hot decomposer zone 23 the $AlCl_3$ crystals are converted into $Al(OH)_3$ and moved by the flight 24 to the collecting bin 43.

The excess of cold mother liquor flows from the cool crystallizer zone 19 into the U-tube 59 and the overflow pipe 42 and is pumped into the heat exchanger 35 and into the collecting tank 33 at about 50° C. Pipe 59 has the branch pipe 60 with the valve 61 and an enlarged pipe with the hydrometer or density indicator 49. The density indicator 49 permits the detection of changes in the composition of the effluent mother liquor, especially with regard to $FeCl_3$ content. It is then possible to correspondingly divert larger or smaller amounts of this mother liquor through valve 29, flowmeter 30 and the pipe 31 into the rotating dryer furnace 26 which is at a temperature of between 250° C to 350° C preferably about 300° C, in which HCl and water are then evaporated. The HCl and water are condensed and incorporated into the main part of mother liquor flowing to the heat exchanger 35 while the residue remaining after evaporation, rich in $Fe_2O_3$ crystals, is transported by screw conveyor 27 into container 28.

The $AlCl_3 \cdot 6 H_2O$ crystals move upwards through the conical intermediate washing section 25 of the "hot-cold tube" (23–19); which is kept relatively cold by cooling water for example sprayed onto its outside. During the advance of these crystals, they are contacted by the $HCl-H_2O$ vapors flowing countercurrently downward from the decomposer 23. The vapors condense partially on the relatively cold $AlCl_3 \cdot 6 H_2O$ crystals moving through the throat of the washing zone 25 and on the relatively cold walls of the conical intermediate washing zone. These condensed vapors form a concentrated solution of hydrochloric acid, which acts on the crystals as a washing liquor with a very high efficiency, as the condensed liquors flow continuously countercurrently downward into the relatively cold crystallizer zone 19 together with the mother liquor containing $FeCl_3$ originally present on the crystal surfaces. In this manner a washing action takes place, which is repeated many times under countercurrent flow conditions by the extremely pure concentrated hydrochloric acid condensate during the entire time the crystals of $AlCl_3 \cdot 6 H_2O$ are transported through the intermediate cone 25. When the crystals of $AlCl_3 \cdot 6 H_2O$ finally arrive in the decomposer 23 they are very pure and produce a very pure, iron free, $Al(OH)_3$. These crystals are thermally decomposed in the crystallizer 23 according to the equation given above and discharged into the collecting bin 43.

The above-described steps in the combined "hot-cold tube" 23 – 19 are promoted by a slight upward inclination of preferably about 5° from the entrance of tube 36 to the outlet of decomposer 23.

As an alternative embodiment for use in very large production units it is preferable to utilize, instead of a rotating hot-cold tube 19 – 23, a stationary hot-cold tube, which is equipped with one or more rotating flight conveyor means for advancing the solid material therethrough. In this hot-cold vessel the same chemical and physical process steps occur as in the rotating hot-cold tube embodiment. The stationary vessel has the advantage, that large bearing and housing are partially or completely eliminated.

Another alternative to the stationary hot-cold tube is a hot-cold tube of large diameter which rotates very slowly and in addition contains internal conveyor means, to keep the solid material moving.

Metals, such as titanium alloys, tantalum, etc., which are not corroded by HCl may be used instead of impregnated graphite in the hot-cold tubes 19 – 23 and in other parts of the process.

Stationary vessels of titanium can be protected against corrosion by the presence of chlorine gas in a low concentration. The presence of chlorine gas also keeps the iron chloride oxidized to $FeCl_3$. The chlorine gas should be of such low concentration, that there is no reduction in the surface condensation conditions for HCl and $H_2O$ vapors.

A considerable reduction of the heat requirements for the thermal decomposition in the decomposer zone 23 may be effected if washing of the crystals in the intermediate washing zone 25 is not made directly by the condensing $HCl-H_2O$ vapors but instead the washing is made by the spraying of hydrochloric acid, which forms, the $HCl-H_2O$ vapors, after having been compressed by a heat pump into the washing zone 25. These vapors transfer their heat of condensation to the $AlCl_3 \cdot 6H_2O$ crystals to be decomposed. This embodiment has the advantage that the consumption of cooling water for the crystallizer 19 is substantially reduced. The most convenient type of heat pump, depending upon the cost relation of electric energy to heat energy, may be a liquid ring pump or a steam injector pump.

In the case of liquid ring pumps, the $HCl-H_2O$ vapors produced in the decomposer 23 are drawn in, compressed and pumped into the heat exchange conduits of the crystal decomposer 23. These conduits act as condensers, in which the heat of condensation is transferred through their walls, which walls may be composed of titanium, a titanium alloy or tantalum, to the decomposer. This heat is absorbed by the $AlCl_3 \cdot 6 H_2O$ crystals, whose thermal decomposition is initiated at about 105° C. The $HCl-H_2O$ vapors, newly generated, are also drawn in by the heat pump and during their compression, they are again used for heating and decomposing new $AlCl_3 \cdot 6 H_2O$ crystals. The condensate of HCl and $H_2O$ is used for washing new $AlCl_3 \cdot 6 H_2O$ crystals, while they pass through the intermediate washing zone 25, wherein the condensate is sprayed under its own pressure onto the crystals. The excess of condensate and the noncondensed HCl vapor is incorporated into the mother liquor of crystallizer 19.

When steam injectors are used as heat pumps, a portion of the $HCl-H_2O$ condensate formed in the conduits of the condenser elements is pumped into a boiler, and the $HCl-H_2O$ vapor formed under pressure in the boiler is used in the steam injector heat pumps for the compression of new $HCl-H_2O$ vapors from the decomposer 23 from atmospheric pressure up to their condensation pressure in the heat exchanger conduits of the decomposer 23. All the $HCl-H_2O$ condensate is fully utilized with a portion being the washing liquid for the $AlCl_3 \cdot 6 H_2O$ crystals in the intermediate washing zone 25, and with the remainder being directly incorporated into the mother liquor of the crystallizer zone 19.

The composition of the $HCl-H_2O$ vapor mixture from the decomposer 23 being about 66 weight % HCl and only 33 weight % $H_2O$, part of the HCl vapor from the decomposer 23, which cannot be absorbed in the concentrated acid, condenses under the pressure and temperature conditions of the heat pump. There is (usually) a quantitative excess of HCl over $H_2O$ in the decomposition vapors, which are compressed by the heat pump and which are then released by an automatic safety pressure release valve into the head space of the crystallizer 19, where they are cooled and dissolved in the mother liquor at about 55° C. This release of the undissolved fraction of compressed HCl gas means thermodynamically an energy loss. This loss is kept as low as possible by displacing the releasing of this HCl gas to a location down-stream from the coldest zone of the decomposer because there the insoluble HCl components are the least value at equal pressure.

If the heat exchanger surface area of the crystallizer decomposer zone 23 is sufficient, it is possible to reduce the heat requirement for the crystallizer decomposition to one-third or less, a fact which is important for the economy of the process. The washing efficiency of the sprayed HCl-$H_2O$ condensate, instead of vapors condensing on the crystals, on the $AlCl_3 \cdot 6 H_2O$ crystals in the washing zone 25, is at least as efficient as of the condensing vapors.

There is an advantage to releasing the HCl-$H_2O$ vapors into the decomposer zone 23 at a few points along its length, because in this manner a much smaller diameter decomposer tube 23 is sufficient for the flow of the vapors. Moreover it is possible to condense the vapors from the different sections of the decomposer length separately. The first vapors produced in the low decomposition temperature range are rich in water and poor in HCl, such that this constitutes an inexpensive method for eliminating water from the system without consumption of added heat for evaporation. This embodiment is preferably for a lengthy decomposer.

In another alternative the mother liquor can be pre-concentrated using a heat pump with a boiler (not shown), which is positioned between the flowmeter 30 and the feed pipe 31 of the dryer 26. The said pre-evaporation is terminated before the concentration of the $FeCl_3$ exceeds the maximum allowable limit of about 45%; and consequently the viscosity of the solution will have no negative effect on the evaporation.

There is also the possibility of extracting the bulk of the $FeCl_3$ content of the diverted mother liquor or of the pre-concentrated diverted mother liquid by isopropyl-ether or another solvent, according to known procedures.

Another advantage of the present invention is that the thermal decomposition of the $AlCl_3 \cdot 6 H_2O$ crystals does not proceed beyond the point which would produce an unsatisfactory solid end product. Also it is possible to avoid having larger fractions of water produced by the decomposition of the $AlCl_3 \cdot 6 H_2O$ join the mother liquor recycled into the crystallizer 19 than is needed.

The clear $AlCl_3$ solution at about 120° C, which leaves the sandfilter 9, usually contains a major amount of $AlCl_3$ and a very minor amount of HCl from the raw material. In this case cooling alone cannot cause a sufficient crystallization of $AlCl_3 \cdot 6 H_2O$, because the solubility of $AlCl_3$ is very slightly dependent upon the temperature. The rate of crystallization can be increased, however, by utilizing a concentrated solution of hydrochloric acid, which is generated in the hot-cold tube 23 - 19.

On the other hand, if the ore starting material in leaching tower 1 is rich in $Fe_2O_3$, then a leaching solution rich in $FeCl_3$ is produced. Thus the $AlCl_3 \cdot 6 H_2O$ crystallization can then be carried out just by the cooling of the $AlCl_3$-$FeCl_3$ solution coming from filter zone 9.

The solubility of $AlCl_3$ in pure water is as follows:

at $-$ 40° C : 26.8% $AlCl_3$
at $+$ 25°C : 31.6% "
at $+$ 98° C : 33.2% ".

This shows that the crystallization of $AlCl_3 \cdot 6 H_2O$ from essentially pure aqueous solutions of $AlCl_3$ would be economically unfeasible, if lowering of the solution temperature were the only crystallization step performed. For this reason a concentrated solution of hydrochloric acid is needed for a satisfactory crystallization.

However if the $AlCl_3$ solution contains sufficient amounts of $FeCl_3$, cooling alone can cause sufficient crystallization to bring it closer to economical feasibility.

A substantial increase in the $FeCl_3$ content of the leaching solution, for example from 2% up to 12%, gives the additional advantage that for the elimination of a certain amount of $FeCl_3$ from the circulating solution, only one-sixth of the amount of water has to be evaporated. The excess of $FeCl_3$ alternatively can be eliminated from the leaching solution by treatment with isopropyl ether.

The residue from the rotating furnace 26, accumulated in tank 28, is primarily $Fe_2O_3$ and can be used as refractory material in a high temperature furnace or for the production of pigments.

Each of the three rotating chambers (a) the "hot-cold tube" 23 - 19 for the crystallization of and for the decomposition of $AlCl_3 \cdot 6 H_2O$, (b) the rotating tube 17 for the solid extraction residue, and (c) the rotating tube 26 for the evaporation of the diverted portion of mother liquor is necessarily provided at each end thereof with bearing housings. It is preferable to maintain these three rotating tubes under a slight vacuum of about 2 mm of water, in order to prevent the escaping of HCl containing vapors even in very small amounts. This small vacuum is applied, for example, to the collecting tank 33 for furnaces 26 and 17 and container 14 by maintaining a continuous slight vacuum on the small washing tower 50. The very small amounts of air drawn in finally reach the washing tower 50 and therein are liberated from their HCl content by water washing or a calcium hydroxide solution and are then discharged into the atmosphere without pollution. The vaccum in the system is checked by the readings of the three air flowmeters 51, 52 and 53 and is controlled by the vacuum intensity on the washing tower 50 of tank 33.

The small amount of acid, eventually discharged from the stuffing boxes of the three pumps 20, 40 and 54, is collected together with a little water and from time to time is recycled back into the circulating liquid, in order to compensate for a deficiency of water eventually resulting from the production of $Al(OH)_3$ instead of $Al_2O_3$.

FIG. 6 shows an alternative to the conical intermediate washing section 25 of the hot-cold tube 19 - 23 shown in FIG. 1. FIG. 6 shows the intermediate washing section 25a made of densely impregnated graphite, equipped with external metallic reinforcing ribs 69, while FIG. 1 shows a conical section, made for example, of tantalum or Ti-Pd.

The heating of the rotating tubes 17, 26 and 23 is from the outside by gas or oil fired burners respectively using the above discussed heat pump systems at least in the lower temperature zones. The cooling of the relatively cold rotating crystallizer 19 is by spraying water from outside, possibly combined with the cooling effect of forced air, in the case that the water temperature is not low enough.

If the concentration of $FeCl_3$ is about 10% to 12% by weight in the leaching liquor, then the $AlCl_3$ concentration in the solution leaving the leaching tower 1 can reach about 27 weight % or more. This will result if the leaching liquor before its entrance into the heat insulated leaching tower 1, is preheated under the pressure of auxiliary pump 54, so high that the leaching liquor, due to the dissolution heat of $Al_2O_3$ in hydrochloric acid, reaches a temperature of about 118° C or more. The temperature to which the leaching liquor has to be preheated for that purpose, depends upon the type and upon the pretreatment of the solid raw material. For leaching calcined raw material a lower preheating temperature is sufficient compared with the case of noncalcined raw material, because the reaction energy of calcined raw material is higher than that of noncalcined material.

The higher temperature in the leaching tower 1, which becomes possible by a high $FeCl_3$ content, as well as by overpressure, results in the advantage of a higher rate of dissolution and of a higher percentage yield of $Al_2O_3$ leached out of the clay, bauxite, etc. By increasing the $FeCl_3$ concentration of the solutions to about 10 to 12% the result is an increase in the boiling point of the solution from about 106° C for solutions containing small concentrations of $FeCl_3$, up to 118° to 120° C for solutions containing 10 to 12% $FeCl_3$.

In order to achieve more readily the maximum temperature in the leaching tower 1, and to avoid boiling the $AlCl_3$ solution in the leaching tower, this solution is kept under a superatmospheric pressure in the leaching tower 1 as well as in the sandfilter 9, preferably by a liquid column in the feeder shaft 10 up to level 4 created by automatic throttling of valve 47, as shown in the alternative of FIG. 4. Above this liquid column the open feeder shaft 10 contains the additional raw material layer reaching level 39, as shown in FIG. 5 so that in spite of the overpressure on the hot $AlCl_3$ solution leaving the leaching tower 1 the open feeder shaft 10 for raw material remains open to receive additional raw material.

Before the filter 9 becomes clogged, it is backwashed as follows. The valves 47 and 45 of the filter 9 are closed, so that the passage of filtered $AlCl_3$-solution from valve 47 to the pipe 36 of the crystallizer 19 is interrupted. Valves 46 and 48 are then opened; and the pump 20 and the stirrer 55 are put into operation. A high pressure stream of pure $AlCl_3$ solution backwash liquid then flows from container 8 through pump 20, valve 48 and sandfilter 9 and pipe 21, so as to lift the cake from the filter bed. The suspension created by the stirrer 55 flows through pipe 21 and screen pipe 22 into the lower part of tower 1, close to the outlet screw conveyor 2 for the solid residue. There the fine prticles stick to the larger residue particles and are taken off with them by the outlet screw conveyor 2. After a few seconds of backwash the above mentioned valves 47, 45, 46 and 48 are returned to their original positions, pump 20 and stirrer 55 are shut down, so that the normal leaching process can continue.

The short conveyor screws 2 push the leached solid residue from the bottom of tower 1 into the pipe 3, where a sufficiently rapid flow of circulating carrier liquid propells the residue up into separator 5 which houses a cylindrical screen drum 11, FIGS. 2 and 3, rotating about a substantially horizontal slightly inclined axis. This screen drum 11 rests on graphite bearings 56 and 57. It has a multilayer screen wall 12 and on its inside conveyor flights 15. The carrier liquid filters through the screen wall 12 of the rotating screen drum 11. Small amounts of fines, which leave the screen drum 11 together with the carrier liquid are harmless. The filtered carrier liquid flows into the container 14 and out through discharge pipe 68 to the recirculation pump 40. The moist solid residue is discharged from the end of drum 11 and carried through pipe 18 into the rotating furnace 17 at 250° C to 350° C, preferably at 300° C, and made, for example, or densely impregnated graphite, titanium alloy, tantalum or other HCl resistant material. The HCl vapor and water vapor formed in furnace 17 are condensed in the heat exchanger 35 and flow into collecting tank 33 at about 50° C in the form of a concentrated solution of hydrochloric acid. This concentrated solution is pumped by means of pump 64 or auxiliary pump 54 through screen pipe 6 into the lower portion of leaching tower 1 as fresh leaching liquor.

The dry leached residue from furance 17, free of HCl and rich in $SiO_2$, is transported by the screw flights of conveyor 58 into the container 41 and can be used, for example, for the fabrication of cement.

The screw conveyor flights 15 in the separator 5 are made of an acid resistant substance such as tantalum sheet, Ti-PD sheet or polyester. Screen drum 11 has a liquid permeable multilayer wall 12 preferably made of two layers of acid proof perforated sheet, expanded sheet or mesh of tantalum, Ti-Pd, hard polyvinyl chloride (PVC) polyester or similar material between which one or more layers of an acid proof filter cloth such as PVC, Teflon ® or the like is enclosed.

The pipe 63, located beneath the rotating tube 11, serves as an emergency overflow for the liquid from the pan 14, in order to prevent any major amounts of liquid from reaching the residue fallpipe 18 and the heated rotating tube 17.

The residue separator 5 is equipped with a second pipe 80 on the side opposite pipe 13 for the introduction of washing liquid, installed in a coaxial manner in a hollow axle within the graphite bearing 57. Through the additional tube 80 is periodically fed a washing liquid, such as a limited amount of water, which has to be added to the system to compensate for $H_2O$ losses, especially if calcined raw material is used. This limited quantity of water is sufficient for washing the solid residue, if it is dosed in a number of portionwise doses and if the r.p.m. speed of the screen drum 11 is increased temporarily. The additional feed pipe 80 is located in such a manner that the washing water is distributed over the entire amount of residue present at the time in the separator 5. The separation and washing process is divided into three separate steps, and can be automatically controlled by programmed equipment. These three steps are as follows:

THE SEPARATION STEP A

The carrier liquid containing solid residue is fed through tube 3 into the screen drum 11. The sreen drum 11 rotates at such a speed, that the centrifugal acceleration upon the solid residue is substantially higher than the force of gravity. The high speed rotation is from 100 to 250 r.p.m., preferably from 120 to 150 r.p.m., in order to distribute the solid residue uniformly over the cylindrical periphery of filter wall 12 of the screen drum 11 and to hold it in place. This avoids imbalancing and overloading the bearings of the screen drum 11, which would otherwise be unavoidable during the transition from low to high angular speed.

WASH STEP B

Washing of the solid residue in the screen drum 11 occurs while the screen drum 11 is maintained at a rapid rotation. The circulation pump 40 is stopped; and the valve 74 releases wash water into the feed pipe 80, preferably in a number of portionwise doses.

SEPARATION STEP C

The valve 74 for wash water is closed. The screen drum 11 is returned to a slower rotation — in the range of 5 to 15 r.p.m., such that the centrifugal acceleration on the solid residue is considerably still than the force of gravity. The screw conveyor flights 15 within screen drum 11 can advance the residue through drum 11 and then discharge the same through outlet tube 18.

The washing steps are repeated as often as is necessary during the separation procedure.

The transition from high revolution speed to low revolution speed, or vice-versa, of screen drum 11 is made necessary, because the tube 11 with its screw conveyor bands 15 at low r.p.m. advances the residue through the length of drum 11 to the outlet 16. However when drum 11 is rotated at a high r.p.m., the solid residue is held in place without advancing.

In the case of very large scale production units it is preferable to install a number of residue separators in parallel, operating with staggered separation and washing cycles. In this manner oversized separators are avoided and the residue can leave the leaching tower 1 semi-continuously or continuously. Filters or centrifuges may be used in place of screen drum 11–12.

The above-described residue washing method is preferably carried out with a number of portionwise injections of washing water, which permits almost total separation of the residual solid from its content of HCl and $AlCl_3$ with a minimum of wash water. This permits disposal of the residue without drying it, or to dry it by direct heating instead of the more costly indirect heating, until it is used, for instance, as an additive in cement production.

In the embodiment of FIG. 4 the solution pregnant with $AlCl_3$ leaves the sandfilter 9 through pipe 36a and flows through the heat exchanger 70 into the crystallizer tube 19. HCl containing mother liquor at about 50° C is pumped through heat exchanger 70 by pump 54 which receives HCl solution from collecting tank 33. Crystallization of $AlCl_3$ and conversion to $Al(OH)_3$ is performed in tubes 19 and 23 and mother liquor and wash liquor, HCl condensate, etc. flows through pipe 59 and a part of it eventually into dryer furnace 26.

In the embodiment of FIG. 5 an extension feeder shaft 10 for tower 1 through which calcined or uncalcined raw material may be fed into tower 1 through which HCl is flowed countercurrent to the raw material feed.

The following examples are illustrative of the invention without being deemed limitative in any manner.

EXAMPLE 1

The motor liquor leaving the crystallizer 19 through conduit 59 had a temperature of about 55° C and has the following composition: about 3.5% $AlCl_3$, about 11.7% $FeCl_3$, about 22.9% HCl, and about 61.9% $H_2O$.

It was used as leaching liquor in tower 1 after having been preheated. The motor liquor was pumped by the pump 54 through the countercurrent heat exchanger 70. A solution of $AlCl_3$ at a temperature of at least 120° C coming from the pressure resistant sandfilter 9 flows through the pipe 36a of heat exchanger 70 (FIG. 4). This system offered the advantage that the $AlCl_3$ solution arrived in a pre-cooled state in the crystallizer 19, thus saving cooling water, and that the leaching liquor was preheated without further consumption of heat energy. Formation of crystals sticking to the inside wall of the central pipe of heat exchanger 70 was not observed.

A leaching liquor with the above composition produced a solution of $AlCl_3$ leaving the leaching tower 1 at about 118° C or higher and with the following composition: about 27 weight % $AlCl_3$, about 10 weight % $FeCl_3$, and about 63 weight % $H_2O$.

After heat exchange with the mother liquor, the $AlCl_3$ solution from sandfilter 9 entered the crystallizer 19 at a temperature of about 85° C, where it was cooled to about 55° C. The bulk of the $AlCl_3$ content was crystallized to produce $AlCl_3 \cdot 6 H_2O$; and washed with the equivalent quantity of $HCl$-$H_2O$ vapors from the thermal decomposition of previously crystallized $AlCl_3 \cdot 6H_2O$. In this manner the mother liquor was transformed into a new leaching liquor with the above-stated composition and temperature. Contemporaneously the mother liquor, which had entered the heat exchanger at its original temperature of 55° C had been preheated under pressure from pump 54 and by heat transfer with the $AlCl_3$ leach solution to about 60° to 90° C. This preheated mother liquor was introduced into the leaching tower 1 through screen pipe 6 to be utilized as the new leaching liquor.

The pump pressure during heating the mother liquid is important, because at normal atmospheric pressure the leaching liquor containing 22.9% HCl boils off HCl vapor at about 75° C. A preferred pump pressure range is about 1 to 4 atmospheres over pressure.

It had been found, that 1000 parts by weight of a solution rich in $AlCl_3$ with the following approximate composition: 27% $AlCl_3$, 10% $FeCl_3$ and 63% $H_2O$ yields about 434 parts by weight of pure $AlCl_3 \cdot 6H_2O$, if cooled in the crystallizer 19 to about 55° C. The equivalent quantity of HCl and $H_2O$ vapors enters the crystallizer and are absorbed in the mother liquor. The mother liquor leaving the crystallizer 19 had the following composition: about 3.5% $AlCl_3$, 11.6% $FeCl_3$, 22.9% HCl, and 62.1% $H_2O$, in spite of the fact that it had been cooled only to about 55° C.

Cooling of the mother liquor to only 55° C is important, because the heat transfer requirements of the cooling system for the crystallizer 19 are substantially reduced both as to the quantity of cooling water and as to the required initial temperature of the water.

This invention has the advantages of (1) a relatively noncomplicated method for leaching alumina from silicate containing clays, (2) substantially lower costs because of the continual recycling of the mother liquor from the crystallizer into the leaching tower as a concentrated solution of hydrochloric acid to be used as fresh leaching liquor, and (3) the presence in the leaching liquor of an effective amount of $FeCl_3$ which permits the crystallization and separation of $AlCl_3$ in substantial quantities from a solution thereof, by only lowering the temperature of the solution. Other advantages will also be apparent to persons skilled in this art.

Although the present invention has been disclosed in connection with a few preferred embodiments thereof, variations and modifications may be resorted to and equivalent equipment used in place of that specifically described without departing from the principles of the invention or the scope of the attached claims.

I claim:

1. Apparatus for the production of pure alumina from silicate containing raw materials comprising means for feeding said raw material into an acid resistant leaching tower from the top portion thereof; means for feeding a leaching liquor containing hydrochloric acid into the bottom portion of said leaching tower, so as to continuously flow said leaching liquor upward countercurrently through said raw material flowing downward in order to leach out the alumina as a solution enriched in aluminum chloride, leaving a raw material solid residue; means for withdrawing said solution enriched in aluminum chloride from the top portion of said tower; means for withdrawing said raw material solid residue from the bottom portion of said tower; means for providing a flowing carrier liquid for conveying said solid residue away from said leaching zone and into a separator means and separator means for removing said solid residue from said carrier liquid; means to convey said solution enriched in aluminum chloride at about 120° C. from said leaching tower into and through a balancing container means and into a backwashable sand filter; means for conveying said solution enriched in aluminum chloride from said backwashable sand filter into the cold crystallizer section of a crystallizer-thermal-decomposer combination, comprising a rotating, inclined tube made of acid and heat resistant material and containing a mother liquor, causing said aluminum chloride to precipitate in said crystallizer as $AlCl_3 \cdot 6 H_2O$ crystals; screw conveyor flights within said tube for transporting said precipitated crystals through an intermediate washing means into a hot thermal decomposer to convert said $AlCl_3 \cdot 6 H_2O$ crystals into al-(OH)$_3$ and into vapors of HCl and water; means for conveying said vapors countercurrent to said crystals from said thermal decomposer through said intermediate washing means and into said crystallizer; means to recover said $Al(OH)_3$; means providing a fluid-tight feeding shaft inside the upper end portion of said leaching tower; and means for adding amounts of new raw material into said feeding shaft to a sufficient height to absorb rising HCl vapors and to prevent escape of said vapors into the atmosphere.

2. The apparatus of claim 1, wherein said separator means for removing said solid residue from said carrier liquid comprises means for introducing said carrier liquid conveying said solid residue into a rotating horizontal cylinder having a liquid permeable acid-proof multilayer wall through which the major portion of said carrier liquid passes; means for recycling said carrier liquid to said leaching tower; means for transporting said solid residue to the end portion of said separator; means for collecting said solid residue at said end portion; and means for conveying said solid residue into a drying furnace.

3. The apparatus of claim 2, wherein said multilayer cylinder wall comprises at least two layers of acid-proof perforated sheet selected from the group comprising tantalum, titanium-palladium and polyester, between which is enclosed at least one layer of an acid-proof filter cloth selected from the group comprising polyvinyl chloride and a polyfluorocarbon material.

4. The apparatus of claim 1, wherein said backwashable sand filter comprises means for preventing said solution enriched in aluminum chloride from flowing from said balancing container into the top portion of a backwashable filter; means for flowing said solution into the bottom portion of said backwashable filter to remove raw material residue trapped therein; and means for transporting said residue with said solution into the bottom portion of said leaching tower to become agglomerated with the raw material solid residue therein.

5. The apparatus of claim 1, further comprising means for recycling the major portion of said mother liquor from said crystallizer means to the bottom portion of said leaching tower, means for diverting a portion of said recycled mother liquor into a rotating furnace at about 250° C to 350° C to evaporate HCl and water, leaving primarily a residue of $Fe_2O_3$, means for condensing said HCl and water into a condensate in a condenser, means for recycling said condensate to be added to the leaching liquor, and means for removing said residue of $Fe_2O_3$, to limit the increase of the $FeCl_3$ concentration in the leaching liquor.

6. The apparatus of claim 1, further comprising means for preheating said leaching liquor containing HCl and an optimum concentration of $FeCl_3$ to at least a temperature that the heat of reaction with $Al_2O_3$ in the raw material in said leaching zone raises the temperature of said leaching liquor to at least about 120° C.

7. The apparatus of claim 6, wherein said means for preheating said leaching liquor comprises a heat exchanger; and means for flowing a solution enriched in $AlCl_3$ through said heat exchanger after it leaves said leaching tower at about at least 120° C.

8. The apparatus of claim 1, wherein said feed shaft is open to the atmosphere and extends vertically upward to a substantial extent; means for damming an essentially stagnant liquid column in said feed shaft to such an extent that the static liquid pressure thereof suppresses boiling and maintains the required temperature in the leaching tower, balancing container means and backwashable sand filter means.

9. The apparatus of claim 5, wherein said solution enriched in aluminum chloride leaves said sand filter means at about at least 120° C and passes through a heat exchanger and into said crystallizer means at 50° C to 55° C; said heat exchanger cooling said solution enriched in aluminum chloride to about 80° C to 85° C and preheating said mother liquor from said crystallizer means flowing countercurrently to said solution, from about 50° C to 55° C to about 60° C to 90° C.

10. The apparatus of claim 2, further comprising means for eliminating excess water from said rotating heater as a hot vapor mixture of HCl and water vapor, means for charging a superimposed stripper layer of raw material containing $Al_2O_3$ into a space above said leaching tower, and means for recycling said hot vapor mixture through said stripper layer to remove said HCl.

11. The apparatus of claim 1, comprising means for condensing vapors of HCl and water from said hot decomposer zone, means for spraying a portion of said condensed vapors onto the cooled inside walls of said intermediate washing means, and means for spraying the remaining portion of said condensed vapors onto the moving crystals of $AlCl_3 \cdot 6 H_2O$.

12. The apparatus of claim 1, further comprising means for periodically withdrawing a portion of the mother liquor from said crystallizer zone, means for concentrating said portion, and means for recycling said concentrated portion back to said mother liquor in said crystallizer.

13. The apparatus of claim 1, further comprising sampler tubes for sampling the $AlCl_3$ solution at different levels of the leaching tower.

* * * * *